(No Model.)
P. P. WEINHOLT.
COMBINED SKIRT LIFTER AND BUSTLE.
No. 436,749. Patented Sept. 16, 1890.
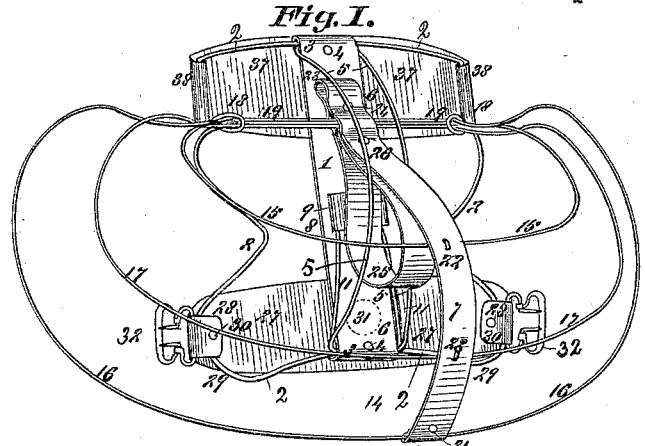
Fig. I.
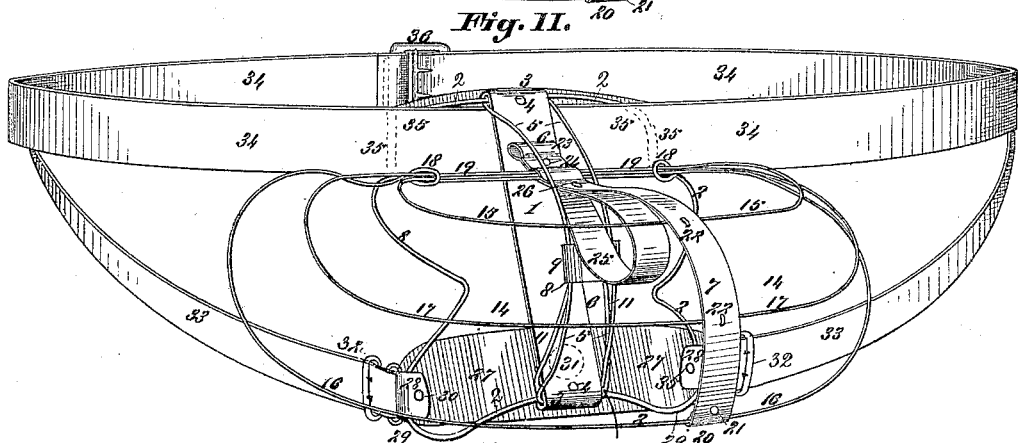
Fig. II.
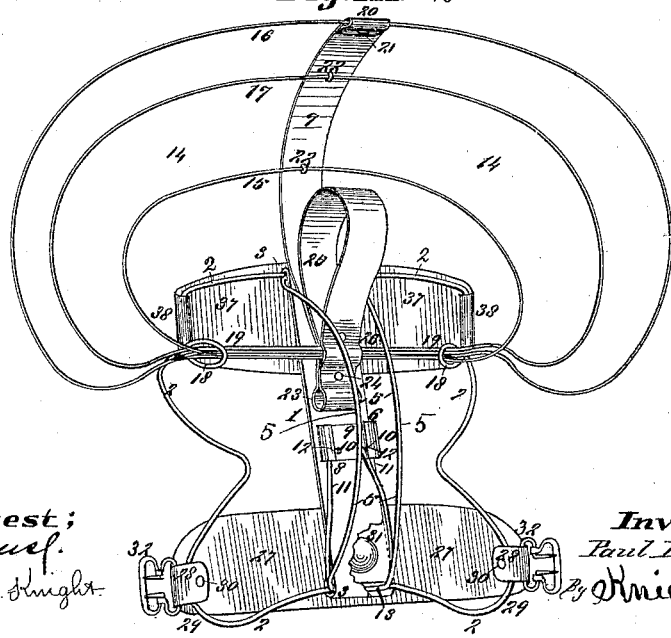
Fig. III.
Attest:
Geo. E. Kues.
Edward D. Knight
Inventor;
Paul P. Weinholt,
By Knight Bros.
attys.
THE NORRIS PETERS CO., PHOTO-LITHO., WASHINGTON, D. C.

UNITED STATES PATENT OFFICE.

PAUL P. WEINHOLT, OF ST. LOUIS, MISSOURI, ASSIGNOR TO GEORGE H. ENGELMAN, OF SAME PLACE.

COMBINED SKIRT-LIFTER AND BUSTLE.

SPECIFICATION forming part of Letters Patent No. 436,749, dated September 16, 1890.

Application filed July 5, 1890. Serial No. 357,862. (No model.)

*To all whom it may concern:*

Be it known that I, PAUL P. WEINHOLT, of the city of St. Louis, in the State of Missouri, have invented a certain new and useful Improvement in Combined Spring-Bustles and Skirt-Lifters, of which the following is a full, clear, and exact description, reference being had to the accompanying drawings, forming part of this specification.

This invention relates to a combined bustle and skirt-lifter that has a spring adjustment which may be nearly entirely collapsed, so as to form only the appearance of an elegant puff at the skirt-seam, may be partially elevated to form a bustle, or, in its third position, may be sprung up to its extreme height for use as a skirt-lifter while passing over muddy crossings, wet grass, &c.; and the invention consists in features of novelty hereinafter fully described, and pointed out in the claims.

Figure I is a perspective view of the combination spring-frame in its collapsed position. Fig. II is a like view of the device in its partially-elevated position in which it forms a bustle; and Fig. III is also a like view, with the lifter elevated to its extreme height, in which it becomes a skirt-lifter.

Referring to the drawings, 1 represents the center back-strap plate of the frame, which remains stationary in a vertical or approximately vertical position, and which is preferably made of thin elastic brass or steel plate, but may be of any other suitable material, and 2 is a stationary frame of eccentric curvilinear formation. Loops 3 at the ends of the elastic strap 1 lap around the middle of the wire frame 2, respectively above and below, and are there securely fastened thereto by rivets 4.

5 represents a duplex parallel bow-wire, whose upper and lower attachment cross ends are respectively held by the upper and lower loops 3 and by the rivets that confine said loops, the two parallel bars of said duplex bow being a suitable distance apart to form a guideway 6 to regulate the movement when sprung of the spring-cushioned elevator-strap 7, hereinafter described.

8 represents a bifurcated hook, whose duplex hook-head 9 is preferably made from sheet brass or steel, which is carried by a duplex bent wire, whose hooks 10 on the duplex arms 11 engage in the perforations 12 in the head of the hook to hold the same, and the cross-tie 13 of said arms engage within the lower loop 3 and pivot there. When turned on its pivot cross-tie to its operative position, the duplex hook is made to engage, respectively, on the two bars of the duplex bow-wires, and is there constituted a buffer-stay for the spring-cushioned elevator-strap 7, that carries the spring elevator-frame, and which frame is thus stayed in its medium position, in which it performs the functions of a bustle.

14 represents the elevator-frame, which is preferably made of a single piece of brass or steel wire, which is bent into loops of varied diameter, as shown in the drawings, there being preferably a minor loop 15, major loop 16, and intermediate loop 17, the latter being both intermediate in size and in position, but the number of said loops may be increased or diminished. The strands or wire of said loops of the frame are congregated together at one side, and thus run in close contact parallel lines, so as to pass together through the eyelet bearer-loops 18, that project from the curvilinear contour of the stationary wire frame 2, and said congregated pivot-strands 19 of the looped frame wire pivot together within said eyelets when the elevator-frame is sprung.

The spring-cushioned elevator-strap 7 is preferably made of brass or steel, and has an outer bearer-loop 20, which embraces the middle of the major loop 16 of the elevator-frame at its outer side, to which said loop is secured by the rivet 21. The outer side of the intermediate loop 17 and the minor loop 15 of said frame are also each respectively secured to said spring-strap at suitable distances apart by clip-ties 22 or any other suitable means, the said spring-strap being of curvilinear form, so as to provide an elegant contour for the elevator-frame. The strap still being bent with a curvilinear outline passes in the guideway 6 between the duplex parallel bow-wires 5 to the congregated pivot-strands 19 of the loops of the elevator-frame half-way between the eyelet-loops 18, in which said strands have their pivot-bearing, over which strands the strap curves, and extending beyond said wires for a suitable distance and purpose hereinafter described the strap is looped to form a circular foot-terminal 23, from which foot-terminal an under layer of said strap folds back in close contact with the said extension of the upper layer, to which it is secured by the rivet 24 between the circle-foot and the pivot-strands of the elevator-frame. The strap then curves around under said strands, closely embracing them, and then loops around in a single large bow-loop, making the cushion-spring 25 to form an elastic spring-cushion rest for the elevator-strap. The final terminal end of said strap, after having been looped up and under the main portion of the strap that it cushions, terminates in contact or near contact with the pivot-strands 19, and immediately in front of said pivot-strands the two-ply of the cushion-strap and the one-ply of the main bearer-strap are all secured together by the rivet 26.

27 represents a preferably brass or steel elastic strap-cushion, but which otherwise may be a padded cushion, which is located back of the lower part of the frame that carries the apparatus. Extension-lugs 28 at the ends of said cushion-strap 27 are looped around so as to embrace the lower laterally-extending loops 29 of the stationary wire frame 2, to which they are secured by rivets 30, which are seated in said lugs of and in said spring-strap within said loops 29 of the wire frame 2, to which the cushion-spring is thus tied.

31 represents a soft cushion-padded anti-rattler button secured on the back of the center back strap near the bottom part of said back strap, in Fig. III being broken away so as to show said button. The said anti-rattler button serves as a buffer-cushion to prevent any clatter from the contact of the spring-strap 27 and the vertical back strap.

Buckles 32 are pivotally attached by the extension-lugs 28 to the spring-strap 27, and serve as means of attachment for the guy-straps 33, which hang pendent from the waistband 34, which waistbands are secured to the apparatus by passing between the vertical back strap and the stationary frame to the top, and to the top bend of which frame said strap may be secured by stitching 35 or other suitable means. A buckle 36, secured to one end of the waistband, and to which the other end of said waistband is made to engage, forms the means for the adjustable attachment of the apparatus to the waist of the wearer.

37 represents a preferably brass or steel elastic strap-cushion, but which otherwise may be a padded cushion, which strap-cushion is located back of the upper part of the frame that carries the apparatus, to which frame it is secured by the loops 38. These above-described spring-cushions provide an easy seat for the apparatus on the body of the wearer, and avoids adverse wear to the clothing, as well as prevents inconvenience to the wearer.

The operation of the device is as follows: The waistband and guy-straps are buckled to their right adjustment to both hold and steady the apparatus while operating. When it is desired that the device should be in its collapsed position, (shown in Fig. I,) in which it provides only an elegant puff to the skirt-seam, the bifurcated hook 8 (which in its operative position is hitched to the duplex parallel bow-wires 5) is then unhitched, and it, with the pivotal arms that carry it, is retired in close contact with the vertical center back strap. The pressure of the circular foot-terminal 23 on the extension of the elevator-strap 7 against the upper portion of said center back strap then springs down the elevator-frame into said collapsed position. When, again, it is desired to use the apparatus as a bustle, the elevator-strap, with its spring-loop cushion and carrier-frame, is sufficiently elevated to enable the remounting of said bifurcated hook on said duplex bow-wires, when said extension circle foot pressing against said back strap springs down the spring-loop cushion 25 in close contact with the duplex hook-head, so as to present the elevator-strap and multiple-loop frame in the position shown in Fig. II. When, however, it is desired to use the apparatus as a skirt-lifter when passing over muddy crossings, &c., the elevator-strap, with the multiple loop-frame it governs, is sprung up to the position shown in Fig. III, the extension circle foot 23 of the elevator-strap 7 having been forced around on the spring center back plate, which springs to let it pass its center bearing, and the said circle foot pressing against the said center back strap then holds the elevator-frame in said position. (Shown in Fig. III.)

I have shown and described the center back strap as single; but I do not confine myself to that form. It may, when preferred, be made double, in which case one of the loops 3 will extend until it overlaps its corresponding loop 3, and then the rivet 4 will pass through said counter-lap as well as through the main strap.

I claim as my invention—

1. In a combined skirt-lifter and bustle, the combination of the center strap 1, having end loops 3, the stationary frame 2, having loops 18, and the multiple-loop spring-frame 14, seated pivotally in said frame, having a strap 7, provided with terminal 23, bearing on the center strap, substantially as described.

2. In a combined skirt-lifter and bustle, the combination of the center strap, the stationary frame, the adjustable multiple-loop spring elevator-frame pivotally connected to said stationary frame, and the spring-cushioned elevator-strap 7, having terminal 23 and connected to the individual multiple loops of said elevator-frame, substantially as and for the purpose set forth.

3. In a combined skirt-lifter and bustle, the combination of the stationary frame having eyelet bearer-loops 18, the vertical stationary center back strap 1, having loops secured around said stationary frame above and below, the multiple-loop spring elevator-frame having congregated strands pivotally connected within said bearer-loops to said stationary frame, the elevator-strap secured around the congregated pivot-strands of the elevator-frame and secured at points of intersection to the individual loops of said elevator-frame, having the circular loop-foot terminal 23, and the loop cushion-spring 25, arranged as a buffer-stay and rest for the elevator-strap and multiple-loop frame, substantially as and for the purpose set forth.

4. In a combined skirt-lifter and bustle, the combination of the stationary frame, the multiple-loop spring elevator-frame pivotally connected to said stationary frame, the vertical back strap, the spring-cushioned elevator-strap 7, and the strap-cushion 37, secured to said stationary frame that eases the set of the apparatus on the waist of the wearer, substantially as and for the purpose set forth.

5. In a combined skirt-lifter and bustle, the combination of the stationary frame, the multiple-loop spring elevator-frame pivotally connected to said stationary frame, the vertical back strap, the spring-cushioned elevator-strap, and the strap-cushion 27, that forms a buffer-stay to the descending spring-frame, substantially as and for the purpose set forth.

6. In a combined skirt-lifter and bustle, the combination of the stationary frame, the multiple-loop spring elevator-frame pivotally connected to said stationary frame, the vertical back strap, the spring-cushioned elevator-strap, the attachment waist-strap 34, arranged to fasten the apparatus to the wearer, the guy-straps 33, pendent from said attachment-strap, the strap-cushions 27 and 37, and the buckles 28, secured to the strap-cushion 27, to which buckles said guy-straps are arranged to be adjustably attached to said buckles, substantially as and for the purpose set forth.

7. In a combined skirt-lifter and bustle, the combination of the stationary frame, the multiple-spring elevator-frame that is pivotally connected to said stationary frame, the vertical back strap, the spring-cushioned elevator-strap, the strap-cushion 27, that forms a buffer-stay to alleviate the descent of the spring-frame, and the anti-rattler button 31, that provides an intermediate cushion between the back strap and said strap-cushion 27, substantially as and for the purpose set forth.

PAUL P. WEINHOLT.

In presence of—
BENJN. A. KNIGHT,
SAML. KNIGHT.